(12) United States Patent
Lim et al.

(10) Patent No.: US 9,479,238 B2
(45) Date of Patent: Oct. 25, 2016

(54) METHOD OF BEAMFORMING AND 3D ANTENNA ARRAY

(71) Applicant: ELECTRONICS AND TELECOMMUNICATIONS RESEARCH INSTITUTE, Daejeon (KR)

(72) Inventors: Kwang Jae Lim, Daejeon (KR); Anseok Lee, Daejeon (KR); Wooram Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/599,452
(22) Filed: Jan. 16, 2015

(65) Prior Publication Data
US 2015/0208251 A1 Jul. 23, 2015

(30) Foreign Application Priority Data
Jan. 20, 2014 (KR) .................. 10-2014-0006881

(51) Int. Cl.
*H04W 4/00* (2009.01)
*H04B 7/04* (2006.01)
*H04B 7/06* (2006.01)

(52) U.S. Cl.
CPC .......... *H04B 7/0456* (2013.01); *H04B 7/0617* (2013.01); *H04B 7/0619* (2013.01); *H04B 7/0413* (2013.01); *H04B 7/0634* (2013.01)

(58) Field of Classification Search
None
See application file for complete search history.

(56) References Cited

U.S. PATENT DOCUMENTS

| 6,639,554 | B2 | 10/2003 | Kim et al. | |
|---|---|---|---|---|
| 2005/0272472 | A1* | 12/2005 | Goldberg | H04W 16/28 455/562.1 |
| 2012/0208581 | A1* | 8/2012 | Ishida | H04B 7/0691 455/509 |
| 2014/0044043 | A1* | 2/2014 | Moshfeghi | H04W 84/00 370/328 |
| 2014/0177561 | A1* | 6/2014 | Yu | H04W 72/042 370/329 |
| 2015/0092875 | A1* | 4/2015 | Kim | H04B 7/0478 375/267 |
| 2015/0146650 | A1* | 5/2015 | Ko | H04B 7/0456 370/329 |
| 2015/0229375 | A1* | 8/2015 | Vook | H04B 7/0469 370/329 |

(Continued)

FOREIGN PATENT DOCUMENTS

JP 2005-210353 A 8/2005

OTHER PUBLICATIONS

Kudo et al., "CSI Estimation Method Based on Random Beamforming for Massive Number of Transmit Antenna Systems", IEEE, International Symposium on Wireless Communication Systems(ISWCS), pp. 716-720, Aug. 28-31, 2012.
Nam et al., "Full-Dimension MIMO (FD-MIMO) for Next Generation Cellular Technology", IEEE, Communications Magazine, vol. 51, Issue 6, pp. 172-179, Jun. 2013.

(Continued)

*Primary Examiner* — Edan Orgad
*Assistant Examiner* — Rebecca Song
(74) *Attorney, Agent, or Firm* — Rabin & Berdo, P.C.

(57) ABSTRACT

Disclosed herein are a method of beamforming and a 3D antenna array. The method includes: transmitting a first control channel; receiving first feedback information on a first antenna set and a first precoding scheme of a plurality of antenna sets included in the 3D antenna array, which are determined based on the first control channel, from a first communication node different from the communication node; and beamforming a traffic channel to be transmitted to the first communication node using the first antenna set and the first precoding scheme.

12 Claims, 8 Drawing Sheets

(56) References Cited

U.S. PATENT DOCUMENTS

2015/0341152 A1* 11/2015 Kim ............... H04W 24/00
370/329
2016/0156399 A1* 6/2016 Chen ............... H04B 7/0626
375/267

OTHER PUBLICATIONS

Hanif et al., "On MIMO Cognitive Radios with Antenna Selection", IEEE, Wireless Communications and Networking Conference (WCNC), pp. 1-6, Apr. 18-21, 2010.

* cited by examiner

BEAM OF AS g-1
BEAM OF AS g
BEAM OF AS g+1

US 9,479,238 B2

METHOD OF BEAMFORMING AND 3D ANTENNA ARRAY

CROSS-REFERENCE TO RELATED APPLICATION

This application claims priority to and the benefit of Korean Patent Application No. 10-2014-0006881 filed in the Korean Intellectual Property Office on Jan. 20, 2014, the entire contents of which are incorporated herein by reference.

BACKGROUND OF THE INVENTION (a) Field of the Invention

The present invention relates to a method of beamforming of a communication node and a 3D antenna array included in a communication node which performs wireless communication.

(b) Description of the Related Art

To improve a data rate and quality of a communication link in a mobile communication network and a wireless local area network, a closed-loop spatial multiplexing (CL-SM) scheme or a closed-loop beamforming (CL-BF) scheme using multiple input multiple output (MIMO) antennas and channel state feedback information on those antennas, has been applied. The CL-SM is a scheme of transmitting multiple data streams in parallel using the MIMO antennas. The CL-BF is a scheme of forming a beam in order to improve signal quality using the MIMO antennas. The CL-SM scheme and the CL-BF scheme have a commonality in aspect of following; a receiving node measures a channel state of a radio link to obtain an appropriate weight value for each MIMO antennas and returns the obtained weight value to a transmitting node, and the transmitting node transmits data signals precoded by the feedbacked weight values.

The traditional beamforming transmission scheme has been applied to a traffic channel or a packet for transmitting data in a wireless communication network. Communication nodes should configure a wireless link to transmit and receive data among nodes. A control signaling process of exchanging control information between the communication nodes is required for the link configuration. Therefore, communication coverage that two nodes can reach each other may be defined based on a coverage area of a control channel or a control packets, and a CL beamforming scheme is needed for the control channels/packets as well as traffic channels/packets in order to extend the communication coverage.

Further, the traditional wireless communication network is based on the assumption that communication is made between a fixed base station (BS) and mobile terminals, in which the base station may include a one-dimensional antenna array which radiates a signal in a specific horizontal direction. Another base station may include a two-dimensional planar antenna array in a horizontal/vertical direction to form a horizontal and vertical beam. However, in the wireless communication network in which all the communication nodes, the base stations and the mobile terminals, move, all the communication nodes need to include an antenna array to configure a beam in any horizontal and vertical direction. In this case, there is a need to develop an appropriate beamforming transmitting/receiving scheme.

However, to form a precise beam in any horizontal and vertical direction using a three-dimensional antenna array, a larger number of antennas than the number of antennas included in the one-dimensional or two-dimensional antenna array need to be used. The communication nodes should perform channel measurement, weight calculation, weight feedback, and beamforming on the large number of transmit and receive antennas among nodes. Overhead and complexity for these processes are large and high.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of beamforming and a 3D antenna array having advantages of extending communication coverage and reducing control and computation complexity and feedback overhead.

An exemplary embodiment of the present invention provides a method of beamforming of a communication node using a 3D antenna array. The method includes: transmitting a first control channel; receiving first feedback information on a first antenna set and a first precoding scheme of a plurality of antenna sets included in the 3D antenna array, which are determined based on the first control channel, from a first communication node different from the communication node; and beamforming a traffic channel to be transmitted to the first communication node using the first antenna set and the first precoding scheme.

The 3D antenna array may include a plurality of element antennas and a plurality of antenna sets. An antenna set consists of some of the plurality of element antennas; m vertical element antennas and n horizontal element antennas. Each antenna set shares some of the m×n element antennas with other adjacent antenna sets.

The first control channel is transmitted by each of the plurality of antenna sets, and may be beamformed by spot beams to sequentially transmit the control channel.

The first control channel includes the first reference signals for horizontal and vertical element antennas which are included in the first antenna set.

The receiving of the first feedback information may be performed by receiving an access channel from the first communication node.

The method may further include: receiving a second control channel of the first communication node from the first communication node; determining a second antenna set and a second precoding scheme of the plurality of antenna sets which are included in the 3D antenna array of the first communication node, based on the second control channel; and transmitting a third control channel including second feedback information on the second antenna set and the second precoding scheme.

The method may further include receiving a traffic channel of the first communication node beamformed using the second antenna set and the second precoding scheme from the first communication node.

Another embodiment of the present invention provides a method of beamforming of a communication node using a 3D antenna array. The method includes: receiving a first control channel from a first communication node different from the communication node; determining a first antenna set and a first precoding scheme of the plurality of antenna sets which are included in the 3D antenna array of the first communication node, based on the first control channel; transmitting an access channel including first feedback information on the first antenna set and the first precoding scheme to the first communication node; and receiving a traffic channel of the first communication node beamformed using the first antenna set and the first precoding scheme from the first communication node.

The method may further include: transmitting a second control channel; receiving second feedback information on a second antenna set and a second precoding scheme for the communication node which are determined based on the second control channel, from the first communication node; and beamforming a first traffic channel to be transmitted to the first communication node using the second antenna set and the second precoding scheme.

The 3D antenna array includes a plurality of element antennas and a plurality of antenna sets. An antenna set consists of some of the plurality of element antennas; m vertical element antennas and n horizontal element antennas. Each antenna set shares some of the m×n element antennas with other adjacent antenna sets.

The broadcasting of the second control channel may include forming, by each of the plurality of antenna sets, spot beams to sequentially broadcast the control channels. The second control channel is transmitted by each of the plurality of antenna sets, and may be beamformed by spot beams to sequentially transmit the control channel.

The method may further include: when channel state is changed or the communication node or the first communication node moves, receiving a third control channel which is transmitted by the first communication node; and updating the first antenna set and the first precoding scheme to a third antenna set and a third precoding scheme based on the third control channel.

The method may further include: transmitting a fourth control channel including third feedback information on the third antenna set and the third precoding scheme to the first communication node.

The method may further include transmitting a second traffic channel including third feedback information on the third antenna set and the third precoding scheme to the first communication node.

Yet another embodiment of the present invention provides a 3D antenna array. A 3D antenna array includes: a plurality of horizontal element antennas configured to form beams in a horizontal direction; a plurality of vertical element antennas configured to form beams in a vertical direction; and a plurality of antenna sets configured to each include some of the plurality of horizontal element antennas and some of the plurality of vertical element antennas, wherein the 3D antenna array is included in a communication node performing wireless communication. Each antenna set shares some of the m×n element antennas with other adjacent antenna sets.

The plurality of antenna sets each may form spot beams to sequentially transmit control channels of the communication node.

The 3D antenna array may receive feedback information on an antenna set forming a spot beam among the plurality of antenna sets and a precoding scheme forming the spot beam from another communication node forming a communication link with the communication node, and form the spot beam based on the feedback information to transmit a traffic channel of the communication node to the other communication node.

DETAILED DESCRIPTION OF THE EMBODIMENTS

Figure 1:
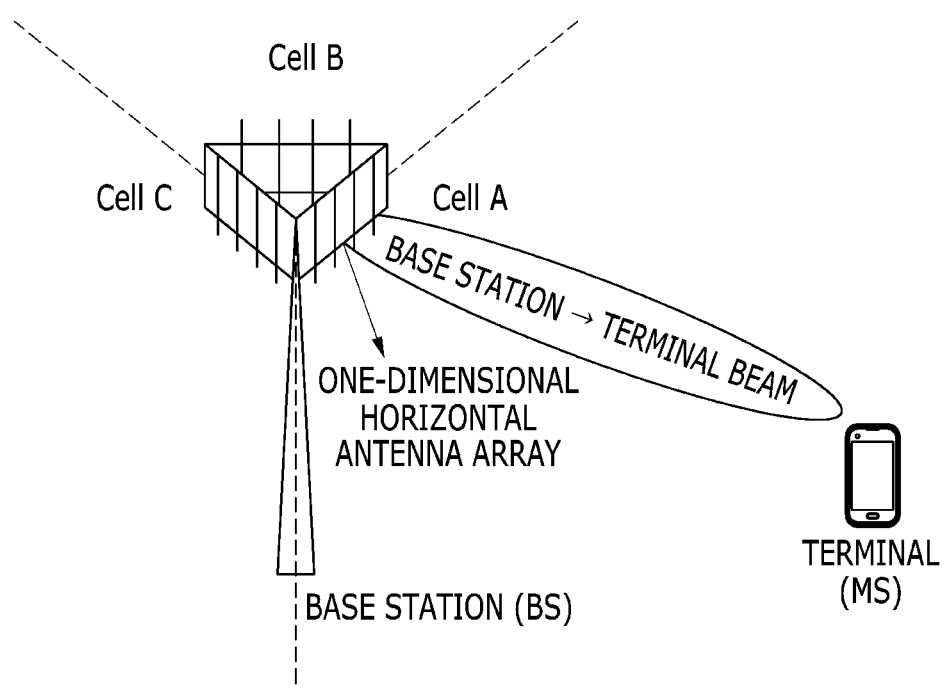
FIG. 1 is a diagram illustrating a beamforming technique between a base station and a terminal in a mobile communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may refer to a mobile terminal (MT), a mobile station (MS), a subscriber station (SS), a portable subscriber station (PSS), an access terminal (AT), user equipment (UE), and the like, and may also include all or a part of the functions of the MT, MS, SS, PSS, AT, UE, and the like.

Further, a base station (BS) may refer to a node B (NodeB), an evolved node B (eNodeB), an access point (AP), a radio access station (RAS), a base transceiver station (BTS), a mobile multihop relay (MMR)-BS, and the like, and may also include all or a part of the functions of node B, eNodeB, AP, RAS, BTS, MMR-BS, and the like.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", "module", and "block" described in the specification mean units for processing at least one function and operation, and can be implemented by software or hardware such as a microprocessor or components or combinations of the software and the hardware.

FIG. 1 is a diagram illustrating a beamforming technique between a base station-terminal in a mobile communication system.

Generally, a site is divided into three sectors, cell A, cell B, and cell C, and a base station provides a cell coverage using a one-dimensional horizontal antenna array for each sector. The base station periodically transmits a reference signal for each antenna of the antenna array. The terminal receives the reference signals for each antenna to acquire channel information between a transmitting antenna of the base station and a receiving antenna of the terminal. The terminal reports channel state information (CSI) configured of precoding information and channel quality information on the transmitting antenna of the base station based on the acquired channel information to the base station. The base station transmits a traffic channel or packets to the terminal based on the reported channel state information, and may apply precoding for each antenna to the one-dimensional horizontal antenna array to form a transmitting beam in a horizontal direction.

Figure 2:
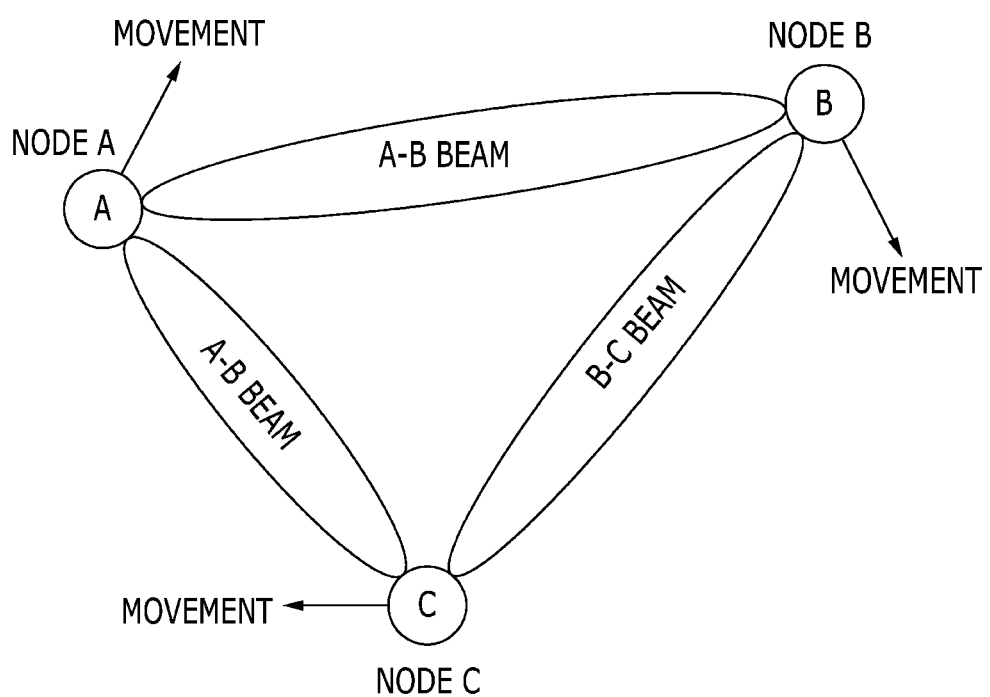
FIG. 2 is a diagram illustrating the beamforming technique in a network in which all the communication nodes move.

FIG. 2 is a diagram illustrating the beamforming technique in a network in which all the communication nodes move.

Each communication node in a wireless mesh network or a wireless ad-hoc network may move in horizontal and vertical directions, and may rotate by itself. Further, each communication node may control the beams formed in the horizontal and vertical directions in consideration of the movement of each node and channel state change in order to maintain wireless links with other communication nodes. As such, a 3D antenna array may be used in the network in which each communication node moves and thus the channel state is changed in real time.

Figure 3:
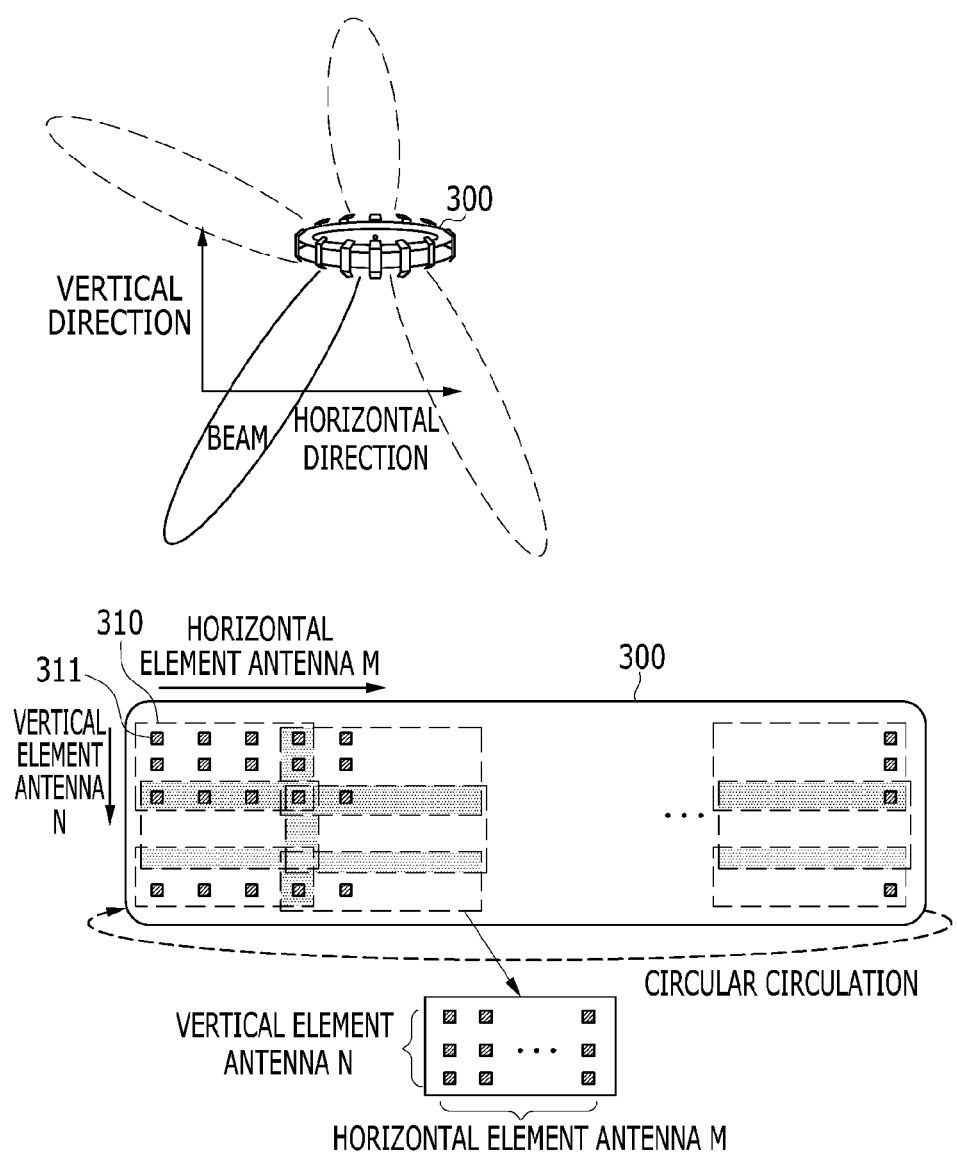
FIG. 3 is a diagram illustrating a 3D antenna array according to an exemplary embodiment of the present invention.

FIG. 3 is a diagram illustrating the 3D antenna array according to an exemplary embodiment of the present invention.

Referring to FIG. 3, a 3D antenna array 300 according to an exemplary embodiment of the present invention includes M horizontal element antennas, which form beams in a horizontal direction, and N vertical element antennas, which form beams in a vertical direction. That is, the 3D antenna array 300 according to the exemplary embodiment of the present invention includes M×N element antennas. The horizontal and the vertical element antennas 311 included in the 3D antenna array 300 may be individually controlled for adaptive beamforming.

According to the exemplary embodiment of the present invention, the horizontal element antennas may be disposed in a circular form to form a beam in a horizontal omnidirection)(360°. The vertical element antenna may be disposed in a curved form so as to form the beam in the vertical direction. Further, the element antennas may be intensively disposed over on the top of the 3D antenna array 300 to form a beam vertically upward.

The 3D antenna array 300 according to the exemplary embodiment of the present invention transmits reference signals by grouping the 3D antenna array 300 into an antenna set (AS) 310 so as to reduce overhead for feedback information, complexity of channel information measurement, and determination of a precoding scheme. The 3D antenna array 300 includes G antenna sets 310, in which each antenna set 310 includes m horizontal element antennas and n vertical element antennas. That is, the antenna set 310 includes m×n element antennas.

Further, to apply the CL-BF, the reference signal and the precoding information for each antenna are required. Therefore, each communication node needs to transmit reference signals for a plurality of antennas, respectively. The 3D antenna array 300 according to the exemplary embodiment of the present invention periodically broadcasts the reference signals of m×n antennas. Each communication node measures the channel information on the transmitted m×n reference signals, determines the precoding scheme of the m×n antenna set 310 based on the measured channel information, and then reports the determined precoding scheme to a transmitting node.

Meanwhile, to densely form a beam in all the directions, the beams formed by each 3D antenna may partially overlap each other. That is, in the 3D antenna array 300 according to the exemplary embodiment of the present invention, the beams formed by the antenna sets 310 adjacent to each other may partially overlap each other. Beams formed by a first set and a final set in a horizontal direction among the antenna sets 310 may partially overlap each other since each group is circulated in a circular form.

Figure 4:
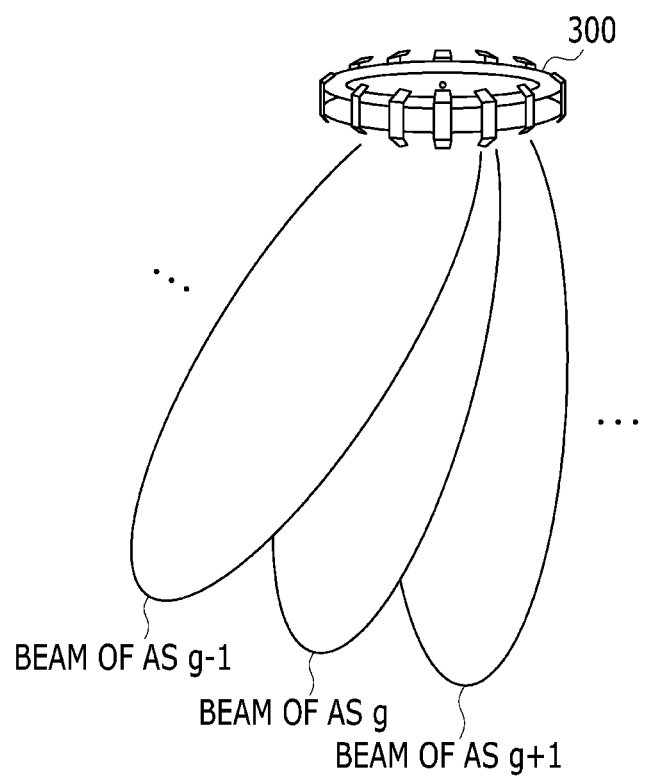
FIG. 4 is a diagram illustrating beams formed in antenna sets of the 3D antenna array according to the exemplary embodiment of the present invention.

For example, the element antenna included in a specific antenna set g may also be included in another antenna set (for example, antenna set g-1) which is close to the antenna set g. In FIG. 4, each antenna set shares the predetermined number of element antennas with each other (shaded portion). Therefore, the number of antenna sets may be defined by the following Equation 1.

$$G > \frac{M \times N}{m \times n} \qquad \text{(Equation 1)}$$

FIG. 4 is a diagram illustrating beams formed in the antenna set of the 3D antenna array according to the exemplary embodiment of the present invention.

Each communication node periodically transmits the control information through the control channel or control packets to configure a wireless communication network with communication nodes therearound. The control channel is transmitted without any adaptive precoding (that is, beamforming is not applied). The control channel may be received by all the communication nodes therearound. However, the control channel which is not precoded has a limited coverage range, and therefore communication coverage between the communication nodes may be substantially limited to a receiving range of the control channel.

According to the exemplary embodiment of the present invention, to extend the substantial communication coverage and improve the quality of the control channel, the control channel is precoded and thus transmitted as the set beam. That is, to form the beams in the predetermined horizontal and vertical directions, the antenna set 310 and the precoding scheme are determined. Further, the control channel is transmitted by a combination of the determined antenna set 310 and precoding scheme.

According to the exemplary embodiment of the present invention, the control channels transmitted by each beam may include the control information and the reference signals of each element antenna belonging to the antenna set 310. For example, when the 3D antenna array 300 includes G antenna sets 310, a beam g transmitted from an antenna set 310 are as follows.

The control channel is transmitted in the beam configured by the antenna set g.
  The precoding scheme previously determined for each antenna set g is applied to each control channel.
  The beam for each control channel include the reference signals for the element antennas included in the antenna set g.
  The beam for each control channel include control information on communication nodes and the communication network.

Figure 5:
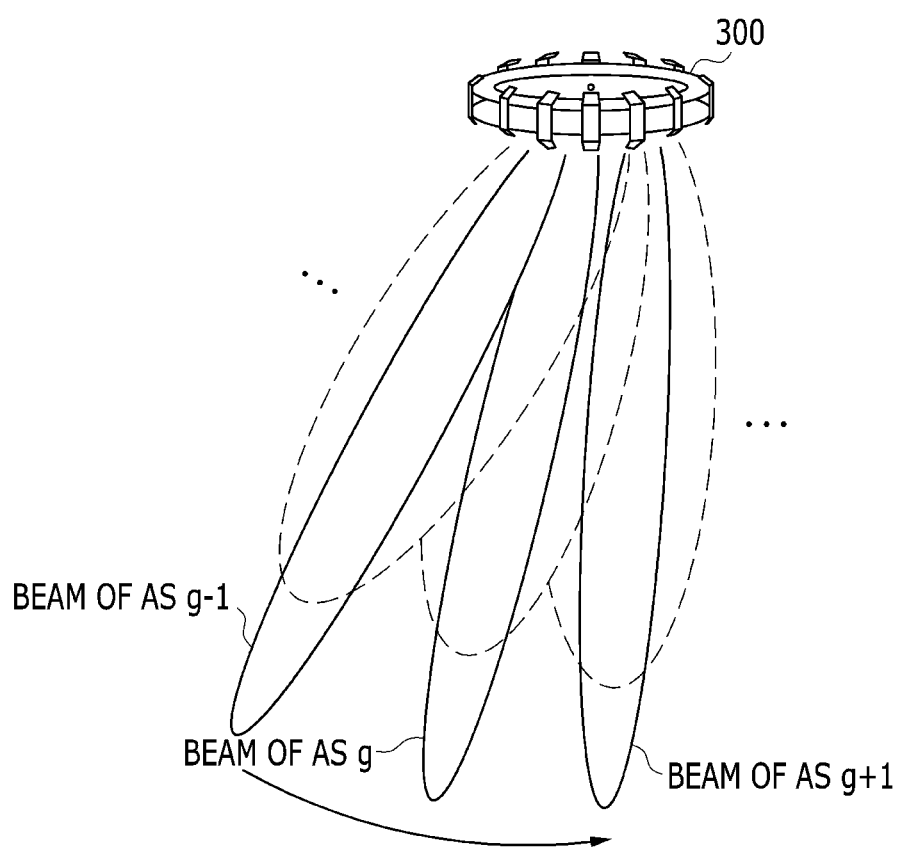
FIG. 5 is a diagram illustrating a control channel beam to which a precoding scheme according to an exemplary embodiment of the present invention is applied.

FIG. 5 is a diagram illustrating a control channel beam to which the precoding scheme according to the exemplary embodiment of the present invention is applied.

According to the exemplary embodiment of the present invention, to more extend the coverage of the control channel beams transmitted from each antenna set, L spot beams formed by L predetermined precoding schemes may be sequentially transmitted. The L precoding schemes are used to generate narrower and longer spot beams. That is, the spot beam is more concentrated than a beam originally transmitted by the antenna set and therefore the spot beam extends the control channel coverage even using the same antenna gain and transmission power. Each antenna set may sequentially transmits the spot beams generated by the L precoding schemes so that the control channel may be evenly transmitted in the coverage and direction originally intended for the antenna set.

The receiving node may receive the reference signals from the transmitting node to determine the precoding scheme for forming the traffic beam and may report the feedback information on the determined precoding scheme to the transmitting node. The transmitting node may form the traffic beam using the feedback information reported from the receiving node. In order for the receiving node to determine the precoding scheme for the traffic beam of the transmitting node, the reference signals in the control beam transmitted by the transmitting node is not precoded or precoded by a scheme which is already known by the receiving node. Similarly, the sequential precoding scheme for the spot beam is not applied to the reference signals included in the control channel or applied according to the sequential precoding scheme. Alternatively, when the precoding scheme for the spot beam is applied to the reference signals, the control channel transmitted by the spot beam includes information on the applied spot beam precoding scheme.

Figure 6:
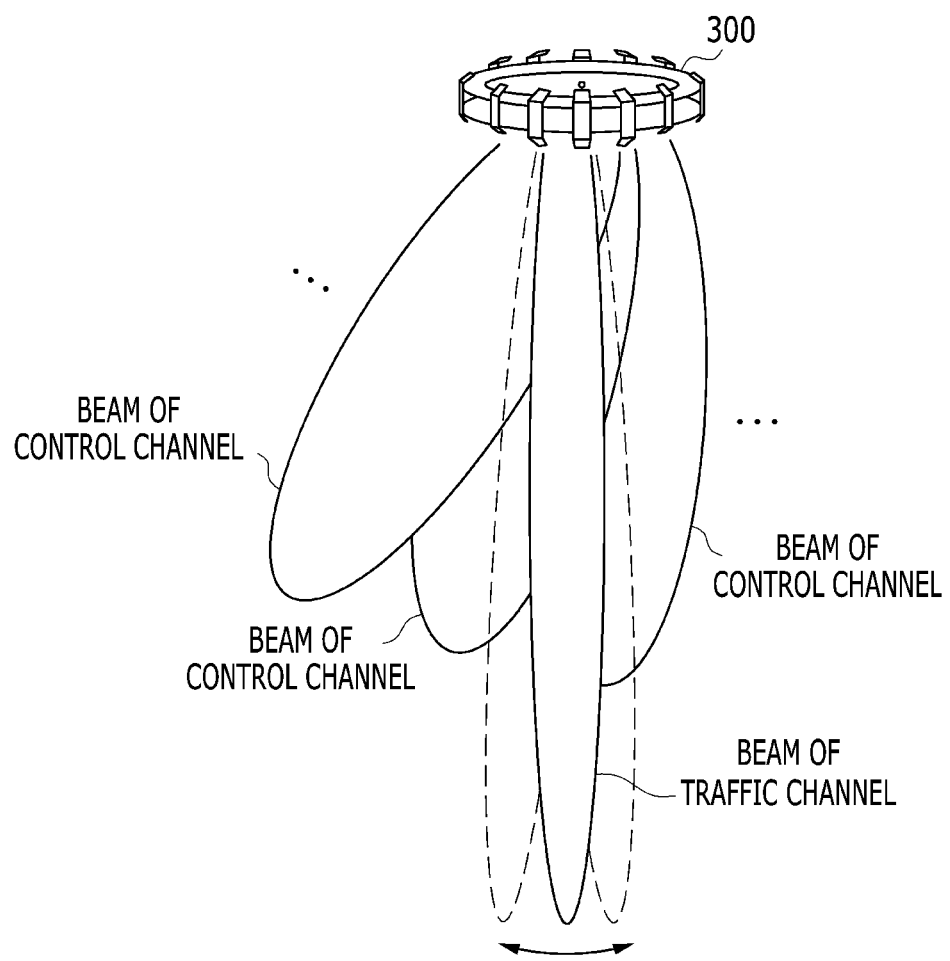
FIG. 6 is a diagram illustrating a traffic channel beam to which a precoding scheme based on feedback according to an exemplary embodiment of the present invention is applied.

FIG. 6 is a diagram illustrating a traffic channel beam to which the precoding scheme based on feedback according to an exemplary embodiment of the present invention is applied.

The receiving nodes around the transmitting node may receive the control channel through at least one control beam or spot beam which is transmitted by the transmitting node. The receiving node may measure the reference signals for each element antenna for the received control channel to determine the antenna set (transmitting antenna set) and the precoding scheme of the transmitting node which are used for data transmission from the transmitting node to the receiving node. That is, the transmitting antenna set and the precoding scheme which are determined by the receiving node are used when the transmitting node transmits a traffic channel to the receiving node. The transmitting antenna set determined by the receiving node may be different from the antenna set and the element antenna which are used for the transmission of the control channel, and the precoding scheme determined by the receiving node may be different from the precoding scheme which is used for the transmission of the control channel.

Further, the receiving node determines the antenna set (receiving antenna set) which is used for the wireless communication with a specific transmitting node among all the antenna sets of the receiving node in order to reduce computation complexity for channel estimation and the precoding scheme for the traffic channel and receiving the traffic channel. The receiving antenna set may be determined depending on received strength of the reference signals transmitted from the transmitting node.

In the case of an initial access, the receiving node receives the control channel of the transmitting node and transmits initial access information to the transmitting node. The receiving node reports the information on the antenna set (transmitting antenna set) and the precoding scheme, which are used when the transmitting node transmits data to the receiving node, to the transmitting node through the initial access channel, along with the access information. The receiving node determines the antenna set of the receiving node, which is used for transmitting the initial access information to the transmitting node, based on received strength of the control channel of the transmitting node. The receiving node may transmit the initial access information using the same antenna set as the receiving antenna set which is used at the time of receiving the control channel.

Next, the transmitting node may use the reported transmitting antenna set and the precoding scheme when it forms a beam n and transmits the traffic channel to the receiving node. Further, the traffic channel includes a pilot signal for the channel estimation and the receiving beamforming of the receiving node. The pilot signal is precoded by the same scheme as the traffic channel.

The control channels and the reference signals which are transmitted by each node are received by other nodes, and the nodes obtain the latest control information and measure a channel state by receiving the control channel and reference signals. After the initial access, the receiving node receives the latest control channel of the transmitting node to update the transmitting antenna set and the precoding scheme which are suitable for the current channel state and the node movement. The transmitting node may update the transmitting antenna set and the precoding scheme by allowing the receiving node to inform the transmitting node of the updated transmitting antenna set 310 and precoding scheme through the control channel or the traffic channel. Further, the receiving node determines its own receiving antenna set which is used for receiving the channels from the transmitting node based on the strength of the reference signal. The receiving node may use the selected receiving antenna set to receive the traffic channel and may estimate the channel by using the pilot signal included in the received traffic channel.

Figure 7:
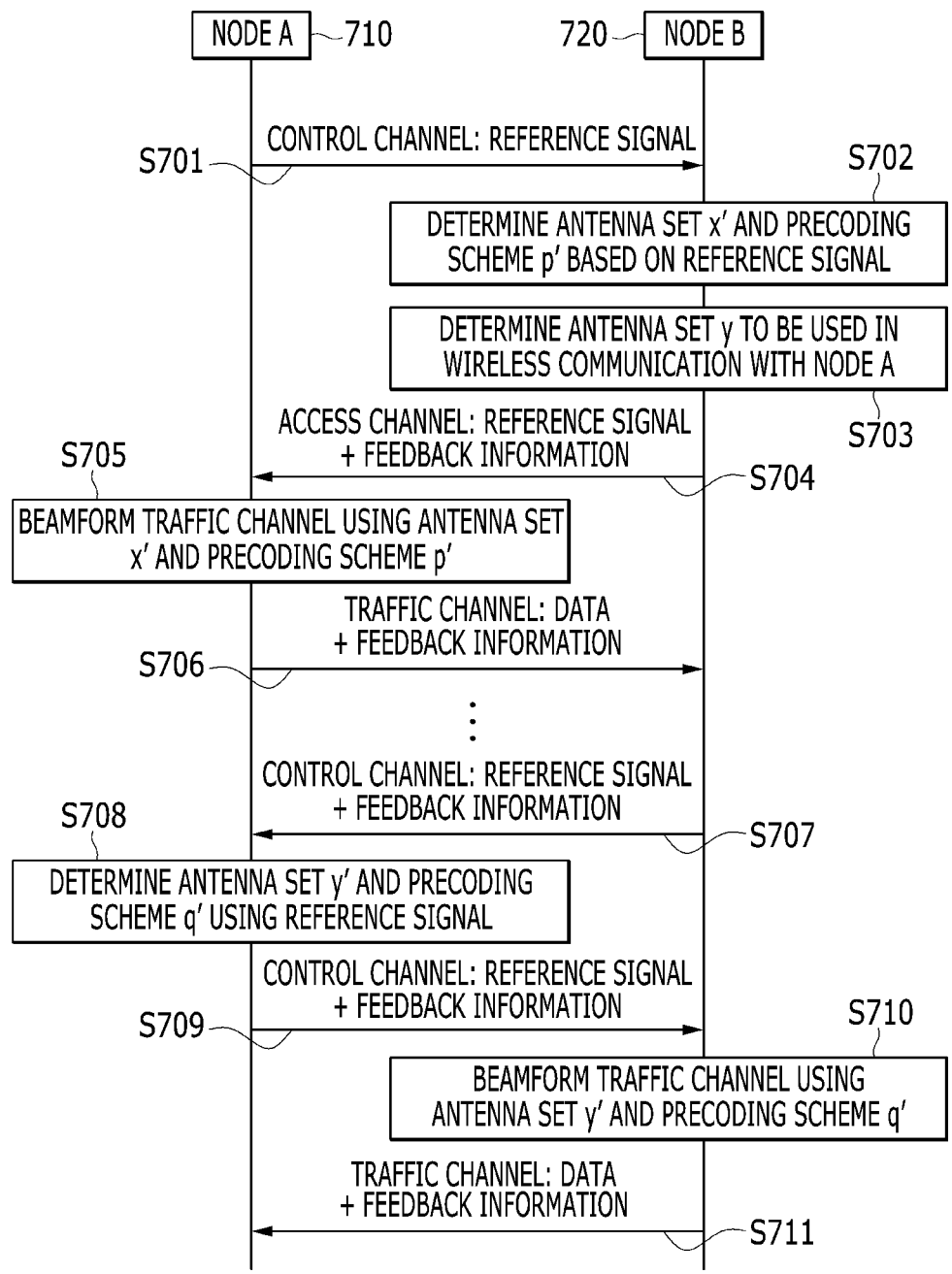
FIG. 7 is a flowchart illustrating a process of transmitting/receiving a beam in two nodes according to an exemplary embodiment of the present invention.

FIG. 7 is a flowchart illustrating a process of transmitting/receiving a beam in two nodes according to an exemplary embodiment of the present invention.

According to the exemplary embodiment of the present invention, all the nodes included in the network periodically broadcast the control channel and the reference signal.

Referring to FIG. 7, a node A 710 broadcasts the control channel through G antenna sets (S701). Each antenna set of the node A 710 may simultaneously broadcast the control channels and sequentially broadcast the control channels. The control channel is transmitted by using a predetermined antenna set x and a beamforming precoding scheme p corresponding to each antenna set, and includes the reference signals of each element antenna belonging to the antenna set.

A node B 720 may receive the control channel and determines an antenna set x' and a precoding scheme p', which are used when the node A 710 transmits data thereto, based on the reference signals (S702). Further, the node B 720 may determine a reception antenna set y for the node A 710 in order to reduce the computation complexity (S703).

When trying the initial access to the node A 710, the node B 720 transmits the access information to the node A 710 through the access channel, and includes the feedback information on the antenna set x' and the precoding scheme p' (S704). The node B 720 uses the antenna set y to transmit the access channel. Further, the reference signal of the element antenna belonging to the antenna set y may be included in the access channel.

The node A 710 may obtain the feedback information (antenna set x' and precoding scheme p') included in the received access channel. Further, the node A 710 may determine a precoding scheme q, which is used when the node B 720 transmits data thereto, by receiving the reference signals in the access channel transmitted by the node B 720.

Next, the node A 710 uses the antenna set x' and the precoding scheme p' to form the traffic channel beam (S705). The node A 710 may feed back the precoding scheme q to the node B 720 through the traffic channel (S706).

The node B 720 performs the receiving beamforming by using the pilot signal which is precoded by the precoding scheme p'. The node B 720 receives the traffic channel using the antenna set y.

Meanwhile, the node B 720 periodically broadcasts its own control channel including the reference signal (S707). The node B 720 may include information on the precoding scheme p' which is used when the node A 710 transmits the traffic channel thereto, in the control channel. Further, the node B 720 may use the antenna set y and antenna sets y−1 and y+1, which are adjacent to the set y, to transmit the control channel.

Further, the node A 710 determines an antenna set y' and a precoding scheme q', which are used when the node B 720 transmits data thereto, by receiving the reference signals of the element antennas included in the control channel of the node B 720 (S708). Further, the node A 710 feedbacks the determined antenna set y' and precoding scheme q' to the node B 720 (S709).

The node A 710 uses the antenna set x' and antenna sets x'−1 and x'+1, which are adjacent to the set x, to transmit the feedback information to the node B 720. The node A 710 may include the feedback information in the control channel of the node A 710.

The node B 720 receives the control channel of the node A 710 and transmits the traffic channel for node A 710 by using the antenna set y' and precoding scheme q' (S710). Next, the node A 710 performs the receiving beamforming on the pilot signal, which is precoded by the precoding scheme q', to receive data in the received traffic channel (S711). The node A 710 receives data using the antenna set x'.

Figure 8:
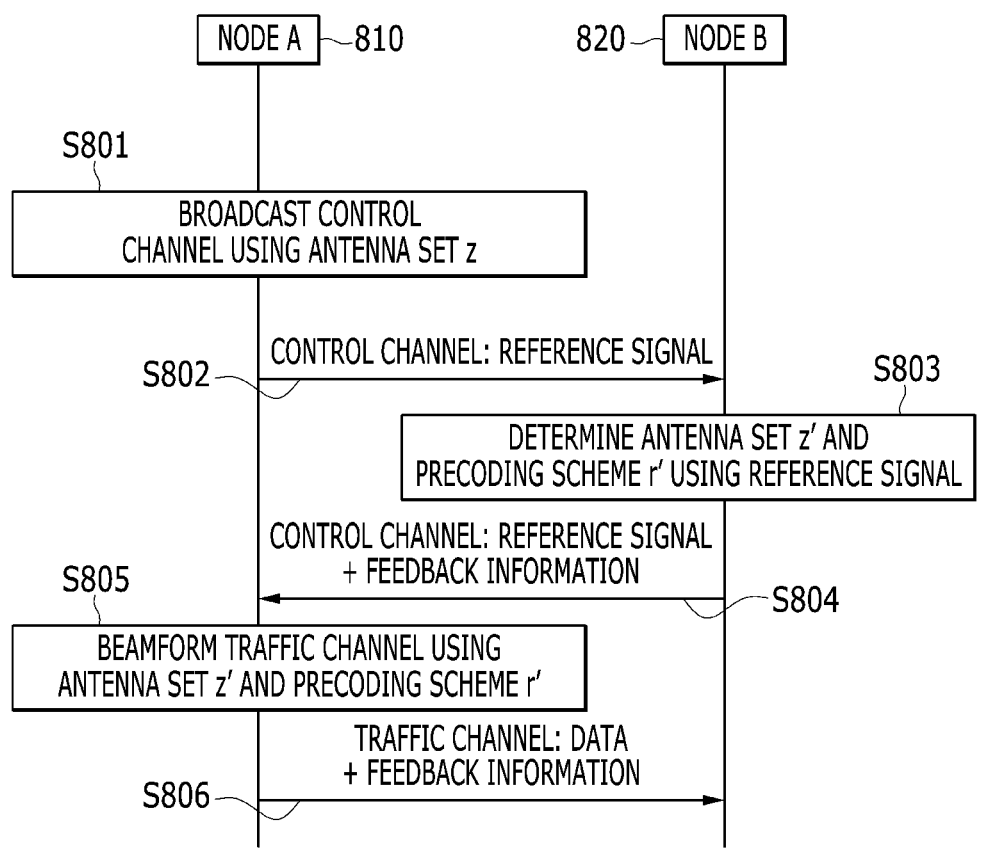
FIG. 8 is a flowchart illustrating a method of updating an antenna set and a precoding scheme in two nodes according to an exemplary embodiment of the present invention.

FIG. 8 is a flowchart illustrating a method of updating an antenna set and a precoding scheme in two nodes according to an exemplary embodiment of the present invention.

Each node needs to update the antenna set and the precoding scheme according to node movement and channel variation. Each node receives control channels and reference signals from other nodes in order to update the antenna set and the precoding scheme, and feeds back the updated result to other nodes.

Referring to FIG. 8, a node A 810 uses an antenna set z and sets z−1 and z+1 therearound to transmit a control channel (S801 and S802). A node B 820 receives the control channel transmitted by the node A 810, and may determine an antenna set z' and a precoding scheme r' which are used when the node A 810 transmits data to the node B 820.

The node B 820 transmits the control channel using an antenna set y' and sets y'−1 and y'+1 therearound, and includes the feedback information (antenna set z' and precoding scheme r') in the control channel (S804). Alternatively, the node B 820 may also include the feedback information in the traffic channel to the node A 810. The antenna set y' of the node B 820 is the latest antenna set which is used to transmit data to the node A 810. Next, the node A 810 uses the updated antenna set z' and precoding scheme r' when transmitting the traffic channel to the node B 820 (S805).

The node A 810 may know the antenna set and the precoding scheme which are used for transmitting data to the node B 820, based on the feedback information received through the control channel or the traffic channel of the node B 820. Next, the node B 820 may receive the traffic channel, which is transmitted using the updated antenna set z' and precoding scheme r', from the node A 810.

By the method described with reference to FIG. 8, each node may appropriately cope with the node movement and the channel variation.

As described above, according an exemplary embodiment of the present invention, it is possible to seamlessly maintain the communication link, extend the communication coverage, and improve the data rate and quality, by beamforming the control channel and the traffic channel using the 3D antenna array. Further, it is possible to reduce the feedback overhead and the transmitting/receiving/control complexity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of beamforming of a communication node using a 3D antenna array, comprising:
   transmitting a first control channel;
   receiving first feedback information on a first antenna set which is included in the 3D antenna array of the communication node and a first precoding scheme for the first antenna set from a first communication node different from the communication node, wherein the first antenna set and the first precoding scheme are determined based on the first control channel by the first communication node; and
   beamforming a traffic channel to be transmitted to the first communication node using the first antenna set and the first precoding scheme, so that the first communication node receives the traffic channel through a second antenna set which is included in a 3D antenna array of the first communication node, wherein the second antenna set is determined based on the first control channel by the first communication node,
   wherein the 3D antenna array of the communication node includes a plurality of element antennas and a plurality of antenna sets, and each of the plurality of antenna sets includes some of the plurality of element antennas, and
   wherein the first antenna set shares some of the plurality of element antennas with adjacent antenna sets of the plurality of antenna sets.

2. The method of claim 1, wherein the transmitting of the first control channel includes forming, by each of the plurality of antenna sets, spot beams to sequentially transmit the control channels.

3. The method of claim 1, wherein the first control channel includes a first reference signal of a horizontal element antenna and a vertical element antenna which are included in the first antenna set.

4. The method of claim 1, wherein the receiving of the first feedback information includes receiving an access channel from the first communication node.

5. The method of claim 4, further comprising:
   receiving a second control channel of the first communication node from the first communication node;
   determining a third antenna set which is included in the 3D antenna array of the first communication node, a third precoding scheme for the third antenna sets and a fourth antenna set to be used for receiving a traffic channel of the first communication node, wherein the fourth antenna set is included in the 3D antenna array of the communication node, based on the second control channel; and transmitting a third control channel including second feedback information on the third antenna set and the third precoding scheme.

6. The method of claim 5, further comprising receiving the traffic channel of the first communication node by using the fourth antenna set.

7. A method of beamforming of a communication node using a 3D antenna array, comprising:

receiving a first control channel from a first communication node different from the communication node;

determining a first antenna set which is included in a 3D antenna array of the first communication node, a first precoding scheme for the first antenna set and a second antenna set to be used for receiving a traffic channel of the first communication node, wherein the second antenna set is included in the 3D antenna array of the communication node, based on the first control channel;

transmitting an access channel including first feedback information on the first antenna set and the first precoding scheme to the first communication node; and receiving the traffic channel of the first communication node through the second antenna set from the first communication node, wherein the traffic channel is beamformed by the first communication node using the first antenna set and the first precoding scheme, wherein the 3D antenna array of the first communication node includes a plurality of element antennas and a plurality of antenna sets, and each of the plurality of antenna sets includes some of the plurality of element antennas, and wherein the first antenna set shares some of the plurality of element antennas with adjacent antenna sets of the plurality of antenna sets.

8. The method of claim 7, further comprising:

transmitting a second control channel;

receiving second feedback information on a third antenna set which is included in the 3D antenna array of the communication node and a third precoding scheme for the third antenna set from the first communication node, wherein the third antenna set and the third precoding scheme are determined based on the second control channel by the first communication node; and beamforming a first traffic channel of the communication node to be transmitted to the first communication node using the third antenna set and the third precoding scheme.

9. The method of claim 8, wherein the transmitting of the second control channel includes forming, by each of the plurality of antenna sets, spot beams to sequentially transmit the control channels.

10. The method of claim 7, further comprising:

when a channel state is changed or the communication node or the first communication node moves, receiving a third control channel which is transmitted by the first communication node; and updating the first antenna set and the first precoding scheme to a fourth antenna set and a fourth precoding scheme based on the third control channel.

11. The method of claim 10, further comprising transmitting a fourth control channel including third feedback information on the fourth antenna set and the fourth precoding scheme to the first communication node.

12. The method of claim 10, further comprising transmitting a second traffic channel of the communication node including third feedback information on the fourth antenna set and the fourth precoding scheme to the first communication node.

* * * * *